July 8, 1969 E. R. LOHNEIS 3,454,313
FORCE TRANSMITTING AND COMPENSATING DEVICE
Filed June 2, 1967
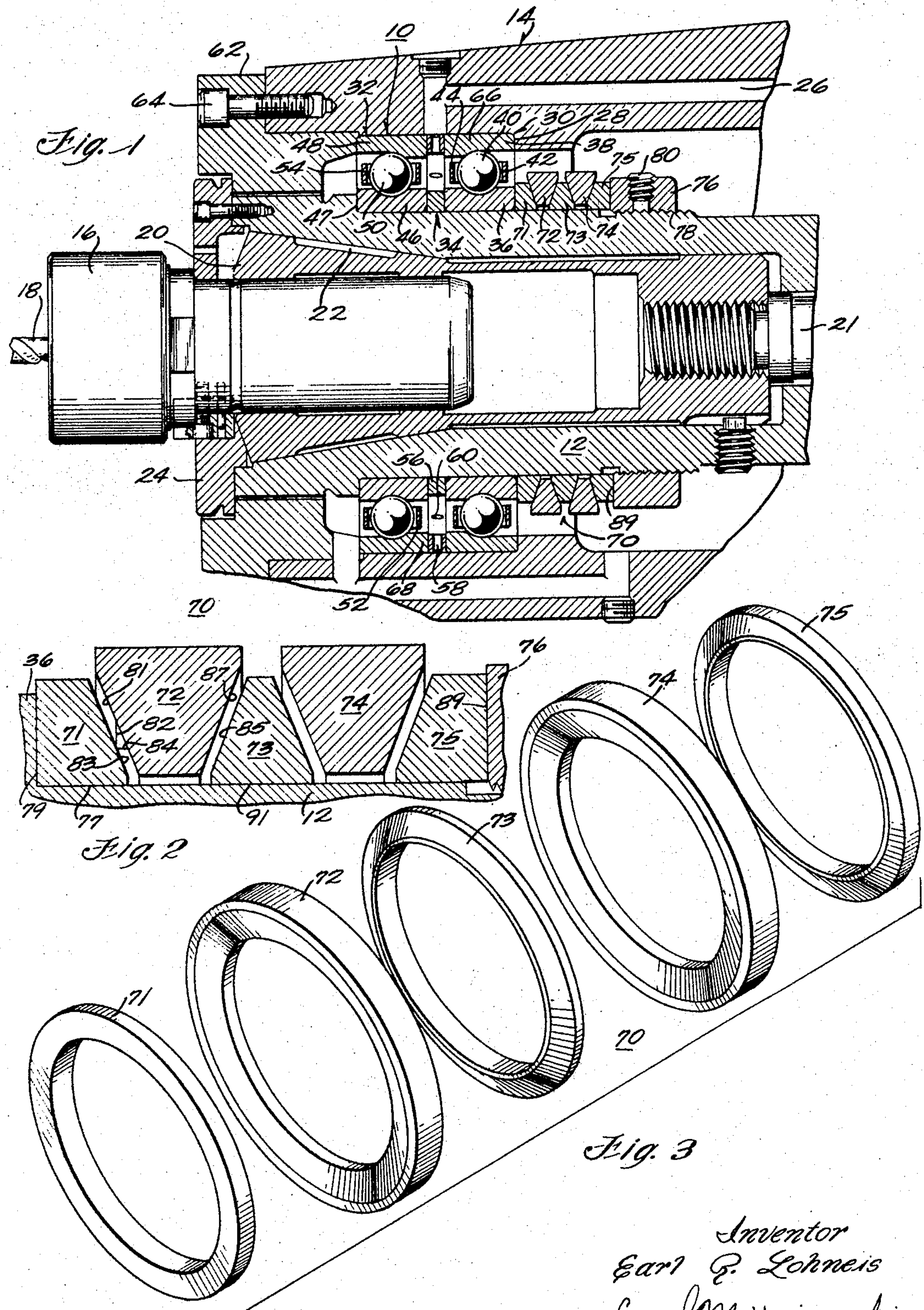

3,454,313

FORCE TRANSMITTING AND COMPENSATING DEVICE

Earl Rex Lohneis, Milwaukee, Wis., assignor to Kearney & Trecker Corporation, West Allis, Wis., a corporation of Wisconsin Filed June 2, 1967, Ser. No. 643,102
Int. Cl. F16c *35/06, 33/30;* F16d *1/08*
U.S. Cl. 308—189 3 Claims

ABSTRACT OF THE DISCLOSURE

A device to both transmit a compressive force to an element, for example, a compressive, axial pre-loading force to a bearing, and to provide force diminishing compensation to the element responsive to temperature increases. The device comprises a plurality of annuli having differential thermal expansion properties and formed so that the circumferential thermal expansion of the annuli produces an axial shortening in excess of the axial thermal lengthening of the annuli, thereby to provide the aforesaid compensation.

BACKGROUND OF THE PRESENT INVENTION—DESCRIPTION OF THE PRIOR ART

In many mechanical applications, a bearing, such as that intermediate a rotating member and a supporting member, is subject to loads other than simple rotary loads. A commonly encountered load is an overhanging load applied to the portion of the rotary member or shaft extending beyond the bearing and tending to cause deflective loads on the shaft and bearing. A second commonly encountered load, and the one of immediate concern to the present invention, is an axial load applied along the axis of the shaft and tending to cause shearing forces in the bearing.

Such axial loads are of particular concern in instances where the axial position of the rotary shaft must remain substantially fixed with respect to the supporting member or some other point. In a typical example, the end of the shaft may contain a tool holder containing a drill. When the drill is applied to a workpiece, as by moving the supporting member and the shaft towards the workpiece, or vice versa, an axial load or force is applied to the shaft and bearing. If the axial position of the shaft with respect to the supporting member is altered responsive to such axial force, the depth of the hole machined by the drill may be altered by a like amount, preventing accurate drilling of the hole.

As the shaft bearing or bearings are intermediate the rotating shaft and the supporting member, attempts to maintain the shaft in a position relative to the supporting member must center on the bearings. Such bearings generally include a pair of concentric races engaging the rotating and supporting members. The inner of the pair of concentric races may engage the shaft while the outer of the pair of concentric races engages the supporting member. Both the races embrace a plurality of balls which permit the relative rotation between the rotating and supporting members.

However, ball bearings, as described above, usually have an inherent force-deflection characteristic that results in larger than desirable axial shifting of the inner race mounted on the shaft with respect to the outer race mounted on the supporting member under applied axial forces. The amount of such axial shifting may be termed the deflection of the bearing and is related to the applied axial force by the spring constant of the bearing. The ability of the bearing to resist such axial forces is often termed the "stiffness" of the bearing.

To minimize axial shifting or movement between the inner and outer races of the bearings, it is a common practice to subject the bearings to a pre-loading force. See "Basic Theory and Application of Pre-Load in Bearings," Machine Design, July 22, 1965. The pre-loading force causes an initial deflection of the inner race relative to the outer race of the bearings prior to the application of an axial load so as to form them into a unitary structure better suited to resisting the applied axial forces than non pre-loaded bearings which, of necessity, have a certain amount of looseness. Such a pre-loading force improves the force-deflection characteristic of the bearings so that they become "stiffer."

In addition to the pre-loading force, a clamping force may be applied to the bearings. This is also a compressive force on the inner races of the bearing and serves to resist the applied axial load. In a typical case, the pre-loading force may be approximately 100 pounds and the clamping force may be 3,000 pounds.

In numerous applications of the above described rotating member, supporting member, and bearing structure, the axial load applied to the rotating member or shaft is inversely proportional to the speed of the shaft. That is, when the speed of the shaft is high, the axial load is low; when the speed of the shaft is low, the axial load is high. The applied axial load may vary from 25 pounds to 1,800 pounds over the speed range of the shaft.

The rate of heat generation in the bearings due to internal friction is proportional to the speed of the shaft and to the axial force on the bearing. The axial force includes both the applied axial load and the pre-loading force. As may be readily appreciated, the greatest rate of heat generation occurs at high shaft speeds. At such high shaft speeds, the applied axial load is low so that most of the axial force on the bearing is caused by the pre-loading force. When the rate of heat generation in the bearings becomes excessive, the bearings begin to heat up and expand due to the temperature increase. This expansion, in turn, increases the bearing internal stresses which subsequently increases the rate of heat generation and the temperature of the bearings.

Thus, a regenerative condition is established which ends only when an equilibrium is reached between the rate of heat generation by the bearings and the rate of cooling by the bearing lubricant or when the bearings fail. Even if the bearings do not fail, their service life is materially shortened by the operation at elevated temperatures.

It is therefore necessary to either strike a balance between the desired high speed of the shaft, the desired stiffness of the bearings, and the operating temperature of the bearings when designing or utilizing the bearings or to include a device in the bearing structure to diminish the pre-loading force as the speed of the shaft increases. This, of course, can be done with relative impunity as the applied axial load on the shaft decreases as the speed increases. As the latter approach provides greater flexibility in the use of the bearings it is generally preferred.

In the main, such a device may comprise a means responsive to the increased rate of heat generation of the bearings when the shaft is rotating at high speed. The device relieves or diminishes the pre-loading and clamping forces applied to the inner races of the bearings as the temperature of the bearing structure increases. In the past, such a device has generally utilized some form of spring means or some material having a low co-efficient of thermal expansion and which is relatively unaffected by the temperature increases.

However, the performance of such devices has been far less than satisfactory, due mainly to their inability to both apply the required amount of pre-loading force and provide the necessary amount of pre-loading force diminishing compensation to the bearings. Accurate control of the amount, application, and duration of such compensating action has also been a problem of such prior art means as has been their large size.

SUMMARY OF THE PRESENT INVENTION

It is, therefore, an object of the present invention to provide an improved means or device to both transmit a compressive force to an element and provide compensation to the element responsive to temperature changes. Such compensation may be in the form of a force diminishing compensation in response to temperature increases. When used in conjunction with a pair of bearings, the device may transmit a compressive pre-loading force to the bearings so as to retain a shaft or rotating member mounted in the bearings in a desired substantially fixed or relative position while also providing force diminishing compensation responsive to temperature increases so as to prolong the service life of the bearings. The device provides a compensating action of the desired magnitude in an easily controllable manner. The means is small and compact in size.

Briefly, the present invention provides a device for transmitting a compressive force between elements and for providing force compensation to the elements responsive to temperature changes. The device is interposed between the elements and comprises thermally circumferentially and axially expansible annuli, the cross sections of which include at least one inclined surface forming an acute angle with a radius of the annuli. The annuli are formed of material having different thermal expansion properties and are juxtapositioned so that adjacent inclined surfaces of the annuli are in abutment.

When the device undergoes a temperature change, for example, a temperature increase, the differential circumferential thermal expansion of the annuli tends to move the inclined surfaces of the annuli radially apart. This results in an axial shortening of the device in excess of the axial thermal expansion thereof which provides a compressive force diminishing compensation to the elements.

BRIEF DESCRIPTION OF THE DRAWINGS

FIGURE 1 is a cross sectional view of the force transmitting and compensating devices of the present invention including portions of elements operatively associated with the device, FIGURE 2 is a partial cross sectional view showing, in detail, the force transmitting and compensating device of the present invention; and FIGURE 3 is an exploded perspective view of the force transmitting and compensating device of the present invention.

DESCRIPTION OF THE PREFERRED EMBODIMENT

While the present invention has many applications, it is shown in exemplary fashion in FIGURE 1 in connection with bearings 10 rotatably journalling a shaft or spindle 12, subject to axial loading, in supporting member or spindlehead 14. Shaft 12 contains tool holder 16 at its exposed end adapted to receive a metal working tool such as drill 18. Wedge shaped jaws 20 which engage slanting inner walls 22 of shaft 12 grip tool holder 16. Jaws 20 are actuated by an inward movement of rod 21 to lock tool holder 16 in the shaft 12. Tool holder 16 will be in abutment with face plate 24 of shaft 12 when it is locked in the shaft. Shaft 12 may be rotated by a suitable means (not shown). It will be appreciated that the application of drill 18 to workpiece (also not shown) will produce an axial force along the axis of shaft 12.

Spindlehead 14 surrounds shaft 12. In addition to the lubricant passages 26 for the bearings 10, hereafter described, spindlehead 14 includes an accurately machined face 28 which serves as a seat for the bearings.

Bearings 10 may compise a pair of ball bearings 30 and 32 separated by a spacer 34. Ball bearing 30 includes an inner race 36 mounted on shaft 12, an outer race 38 mounted in spindlehead 14 and seated against face 28, and balls 40. Balls 40 may be retained in bearing 30 by means of retainers 42 and 44. Ball bearing 32 includes an inner race 46, mounted on shaft 12 and abutting machined face 47 on shaft 12, an outer race 48 mounted on spindlehead 14, and balls 50. Balls 50 may be retained in bearing 32 by means of retainers 52 and 54. Spacer 34 is comprised of an inner ring 56 which abuts both inner race 36 and inner race 46 and a concentric outer ring 58 which contains a plurality of lubricant ports 60 communicating with lubricant passage 26. The outer races 38 and 48 of bearings 30 and 32 are retained in abutment with machined face 28 by bearing cap 62 which is fastened to the end of spindlehead 14 by cap screws 64 and bears on outer race 48 of bearing 32.

As may be noted from FIGURE 1 each of outer races 38 and 48 have a depending lip 66 and 68 adjacent outer ring 58. The purpose of lips 66 and 68 is to transmit axial loads applied in either direction to shaft 12 to supporting member 14. Specifically, axial loads applied to shaft 12 attempting to move the shaft to the right as shown in FIGURE 1, for example, the loads incurred by applying drill 18 to a workpiece, are transmitted by lip 68 of outer race 48 which contacts balls 50 and prevents them from moving to the right. In a similar manner lip 66 on outer race 38 transmits axial loads tending to move shaft 12 to the left.

In order to form bearings 10 into a unitary structure suitable for resisting applied axial loads without appreciable load deflection, a compressive pre-loading force is applied to inner races 36 and 46 to provide an initial deflection of the inner races relative to the outer races of the bearings. The axial length of inner races 36 and 46 may be slightly less than the axial length of outer races 38 and 48 so that before pre-loading, gaps exist between each of the inner races and inner ring 56 of spacer 34, when outer races 38 and 48 are in abutment with outer ring 58 of the spacer.

The pre-loading force is applied to the inner races, by a means hereinafter described, to compress both the inner races and to move them into abutment with inner ring 56, thereby providing the initial deflection to the bearing. This deflection moves balls 40 and 50 into contact with lips 66 and 68 of outer races 38 and 48 prior to the application of any axial load to shaft 12 and eliminates any looseness in the bearing tending to cause excessive load deflection.

In addition to the aforementioned pre-loading force on inner races 36 and 46, a compressive clamping force may be applied to the inner races to compress them against spacer 56 with a force greater than the maximum anticipated axial load so that the bearings remain relatively unaffected by such applied loads.

Due to the internal friction present in the bearings, heat is generated when shaft 12 is rotated. As previously noted, the rate of heat generation becomes excessive when shaft 12 is rotating at high speeds. As the pre-loading force applied to the bearings remains constant over the speed range of the shaft, it is small relative to the applied axial load at low shaft speeds but large relative to the applied axial load at high shaft speeds so that at high shaft speeds the pre-loading force becomes a major cause of heat generation in the bearings. It therefore becomes necessary to relieve the pre-loading force on the bearings as the shaft speed and rate of heat generation increases.

A device to both apply the compressive pre-loading and the clamping forces to bearings 10 and to provide compensation to the bearing responsive to temperature changes comprises the subject of the present invention and includes annular means 70 of generally trapezoidal cross section. As such, the axial cross section of the annuli has a pair of parallel surfaces and a pair of nonparallel inclined surfaces.

As shown in the figures, annulus 71 surrounds shaft 12 with its major parallel surface or base 77 in contact with the shaft. Annulus 71 is positioned on the shaft so that one of its nonparallel surfaces 79 is in abutment with the inner race 36 of bearing 30. The aforementioned nonparallel surface is perpendicular to the major parallel surface 77 of annulus 71.

A second annulus 72 having its trapezoidal cross section inverted with respect to the trapezoidal cross section of annulus 71 also surrounds shaft 12. Annulus 72 is placed so that one of its nonparallel inclined surfaces 81 is in abutment with the exposed nonparallel surface 83 of annulus 71. To provide for such abutment, the nonparallel surfaces of both annulus 71 and 72 may be inclined at the same acute angle with respect to a radius of shaft 12. As may be noted from the drawing, the portion of the nonparallel surfaces of annuli 71 and 72 adjacent the major parallel surface may be made perpendicular to the latter surface.

A third annulus 73 is placed on shaft 12 with its major parallel surface 91 in contact with the shaft. One of the nonparallel surfaces 85 of annulus 73 is in abutment with the exposed nonparallel surface 87 of annulus 72. The aforesaid nonparallel surfaces of annuli 72 and 73 are also inclined at the same acute angle with respect to a radius of shaft 12.

Annular means 70 is completed by the addition of a fourth annulus 74 identical to annulus 72 and a fifth annulus identical to annulus 71. The perpendicular nonparallel surface 89 of annulus 75 rests against nut 76 which is coaxially mounted on shaft 12 and movable along shaft 12 on threads 78.

To provide the desired amount of pre-loading and clamping compressive force, nut 76 is tightened against the perpendicular nonparallel surface 89 of annulus 75 so as to compress the annular means 70 and the inner races 36 and 46 of ball bearings 30 and 32 against inner ring 56 of spacer 34. The amount of such compressive force may be determined by the use of a torque wrench in tightening nut 76. Nut 76 is retained in the desired position by set screw 80.

As previously noted, a salient feature of annular means 70 is its ability to provide compensation to bearings 10 in response to a temperature change of the bearings and associated portions of shaft 12 and spindlehead 14. This feature of annular means 70 is provided by the inclined nonparallel surfaces of the annuli and by the materials from which the annuli are constructed. In the presently preferred embodiment of the invention, it has been found desirable to make annuli 71, 73, and 75 of a material having a low coefficient of thermal expansion. For example, these annuli may be constructed of Invar, an iron alloy containing 35.5% nickel. The coefficient of thermal expansion of this material is approximately .0000012 inch per inch of length per degree Fahrenheit.

Annuli 72 and 74 are constructed of a material having a high coefficient of thermal expansion, such as aluminum or a high strength aluminum alloy. Aluminum has a coefficient of thermal expansion of approximately .00001 inch per inch of length per degree Fahrenheit.

The proportions of annular means 70 are such that its stiffness is many times greater than that of bearings 30 and 32.

Annular means 70 provides compensation to bearings responsive to temperature changes in the following manner. The performance of annular means 70 will be observed as providing force diminishing compensation to bearing 10 responsive to a temperature increase, for example, a 50° F. temperature rise. The following dimensions of annular means 70 will be used. The diameter of annular means 70 is 4 inches from the centers of two diametric cross sections and the average length of each annulus is .25 inch.

When the temperature of the bearings and surrounding structures increases, as for example, when the speed of shaft 12 increases, annular means 70 will expand along with such other structures. The annuli will expand in both the circumferential direction and in the axial direction. That is, the annuli will get larger in circumference or perimeter as well as wider. As shown immediately below, the circumferential expansion of the annuli provides an axial shortening of annular means 70 far in excess of the axial expansion or lengthening of annular means 70 so that the net effect is an axial shortening of annular means 70 as the temperature increases.

Specifically, for a temperature increase of 50° F., the circumferential expansion of the annuli 72 and 74, that is, the aluminum rings, is as follows:

$$\Delta \text{ circumference} = \text{circumference} \times \left(\begin{matrix}\text{coeffic.}\\ \text{therm. exp.}\end{matrix}\right) \times \begin{matrix}\text{temp.}\\ \text{change}\end{matrix}$$

$$= (\pi \times 4) \quad \times .00001 \quad \times 50$$

$$= .00628 \text{ inch}$$

The circumferential expansion of annuli 71, 73, and 75, or the Invar rings, is given by the same formula and is as follows:

$$= (\pi \times 4) \quad \times .0000012 \quad \times 50$$

$$= .00075 \text{ inch}$$

Thus the circumferential increase of annuli 72 and 74 over annuli 71, 73 and 75 for a 50° F. temperature rise, or the differential expansion between the two groups of annuli, is the difference between the two circumferential expansions given above or .00553 inch. The radial increase of annuli 72 and 74 over annuli 71, 73 and 75 corresponding to such a circumferential increase may be found by dividing the circumferential expansion by $2\pi$ and is equal to .00088 inch. The .00088 inch differential radial expansion of annuli 72 and 74 over annuli 71, 73, and 75 is shown diagrammatically and not to scale by the radial distance 82 in FIGURE 2.

As the primary concern is the axial shortening of annular means 70, it is necessary to find the axial shortening produced by the circumferential increase of annuli 72 and 74 over annuli 71, 73, and 75. This may be computed by applying the tangent function to the radial difference previously computed. The exact tangent function used depends on the inclination of the nonparallel surfaces of annular means 70. In a typical instance, such surfaces will be inclined approximately 25° with respect to the radius of shaft 12. Thus the amount of axial shortening of annular means 70 produced by the radial increase of annuli 72 and 74 over annuli 71, 73, and 75 is .00088 inch times the tangent of 25° or $.00088 \times .466 = .00041$ inch. This is shown diagrammatically by axial distance 84 in FIGURE 2.

As there are four surfaces along which such axial shortening occurs, that is, the four inclined surfaces of annuli 72 and 74 the total shortening of annular means 70 is four times .00041 inch or .00164 inch.

This axial shortening will be partially offset by the axial expansion of annular means 70. The axial expansion of both aluminum annuli 72 and 74 is their combined length of .50 inch times .00001 times 50° or .000025 inch. The axial expansion of the three Invar annuli is their combined length of .75 inch times .0000012 times 50° or .000045 inch. The total axial expansion of annular means 7 is thus .000070 inch.

The axial shortening of annular means 70 due to the circumferential expansion of the annuli must be offset by the axial expansion of the annuli so that the former computed to be .00164 inch must be lessened by .000070 inch for a net axial shortening of .00157 inch.

One final consideration in the lessening of the compressive pre-loading and clamping forces on bearings 10 due to the thermal expansion of shaft 12. This expansion tends to move nut 76 away from machined face 47 and thus lessen the compressive force on bearing inner races 36 and 46. The amount of this expansion may be determined by multiplying the partial length of the shaft operatively associated with annuli 70 by the coefficient of thermal expansion of the shaft material and the temperature rise. Assuming the shaft is made of steel, the amount of such expansion is 1.25 inches, that is, the .75 inch of annuli 71, 73, and 75 and the .50 inch of annuli 72 and 74, times .000006, or the coefficient of thermal expansion of steel, times the 50° F. temperature rise. The amount of such expansion is .00037 inch.

As previously noted, this expansion is additive to the axial shortening of annular means 70 as far as relieving the compressive force on inner races 36 and 46 is concerned so that the total effective axial shortening of annular means 70 is its own axial shortening of .00157 inch plus the expansion of shaft 12 of .00037 inch or .00184 inch.

The amount of possible compressive force relief or diminution provided to inner races 36 and 46 of bearings 30 and 32 may be computed as follows, disregarding the axial lengthening of the bearing because of its own thermal expansion and the initial compression of annular means 70. The .00184 inch axial shortening of annular means 70 permits a corresponding axial lengthening of the inner bearing races which tends to cause a reduction in the force applied to the bearing races. The resulting force per area or unit stress relief is given by the formula $S=Ee$ where S is the unit stress, E is the Young's modulus of the bearing inner race material and $e$ is the unit strain or $\Delta 1/1$. Assuming the inner races are constructed of steel, having a Young's modulus of 29,000,000, the stress relief will be:

$$S=29{,}000{,}000\times\frac{.00184}{2.25}$$

$$=23{,}700 \text{ pounds/sq. inch}$$

Thus annular means 70 provides a force diminishing compensation of 23,700 pounds/sq. inch for a 50° F. temperature increase.

The compactness of the above described annular compensating means may be amply demonstrated by the following calculations which show the length of a single solid Invar annulus necessary to provide the same decrease in length as provided by the 1.25 inches of annular means 70. A means employing such a single Invar annulus must, of necessity, rely only on the greater rate of expansion of steel shaft 12 over the rate of expansion of the Invar annulus. Such a rate is the coefficient of thermal expansion of the shaft, .0000060 inch per inch of length per degree Fahrenheit, less the coefficient of thermal expansion of the Invar annulus, .0000012 inch per inch of length per degree Fahrenheit, or .0000048 inch per inch of length per degree Fahrenheit. The length of the Invar annulus necessary to provide an axial expansion of .00184 inch to inner races 36 and 46 of bearings 30 and 32 is:

$$.00184=\text{length}\times.0000048\times50°$$

or 7.65 inches. Thus a single Invar annulus must be over 6 times longer than annular means 70 to provide the same amount of shortening.

Another feature of annuli 70 as a compensating means is the ease and flexibility with which the amount of compensation provided by the means may be controlled to lessen or increase the amount of such compensation.

To increase the amount of force diminishing compensation provided by annular means 70, the material from which annuli 72 and 74 are constructed may be changed to one having a greater coefficient of thermal expansion. For example, annuli 72 and 74 may be constructed from zinc rather than aluminum. Zinc has a coefficient of thermal expansion of .000015 inch per inch of length per °F. The amount of axial shortening provided during a 50° F. temperature rise would be .00285 inch.

Another means by which the amount of shortening may be increased is by increasing the angle of the inclined surfaces of annular means 70. For example, if the angle of such surfaces, with respect to a radius of the annulus is increased from 25° to 30° the tangent function of the angle in increased by a corresponding amount and the amount of axial shortening produced by the circumferential expansion of the annular means 70 is correspondingly increased. The amount of such shortening may be increased from the aforementioned .00184 inch to .00234 inch by increasing the angle of the inclined surface of annular means 70 to 30°. It will be appreciated that the inclined surfaces of a given annulus may form differing acute angles with respect to a radius. For example, one such surface may be at a 20° angle while the other inclined surface is at a 30° angle. The trapzeoidal cross section of annuli 70 is not mandatory. The cross sectional configuration may be triangular, trapeziform, or some other shape having a cross section including inclined surfaces.

The amount of shortening may also be increased by adding additional annuli to annular means 70. For example, if two additional annuli, one aluminum and one Invar are added to annular means 70, the amount of axial shortening is increased to .00237 inch.

In an analogous manner the amount of force diminishing compensation provided by annular means 70 may be lessened in any one of the following ways. The aluminum annuli 72 and 74 may be formed of a material having a lower coefficient of thermal expansion, such as copper, thereby to lessen the differential rate of thermal expansion between annuli 72 and 74 and annuli 71, 73, and 75. The differential rate of expansion may also be decreased by substituting a material having a greater coefficient of thermal expansion for the Invar of annuli 71, 73, and 75. The angle of the nonparallel sides may also be reduced, as may the number of annuli included in annular means 70.

In view of the foregoing, it will be readily apparent that the present invention provides an improved means to both transmit a compressive force between the elements and compensate for the expansion and contraction of the elements responsive to temperature. Such a means may thus retain a shaft mounted in bearings in a desired axial position while at the same time prolonging the service life of the bearings. The means provides compensation of the desired magnitude in an easily controllable manner. The means is compact in size.

I claim:

1. A device for transmitting a compressive force between elements mounted on a shaft; a first group of annular members mounted on said shaft between said elements for transmitting the force, said annular members having a substantially isosceles triangular cross section with the base of the isosceles triangle being juxtaposed along the circumference of said shaft to form V-shaped spaces between them with the V shape opening outwardly; a second group of annular members mounted about said shaft for transmitting the force and being disposed in alternating relationship with the annular members of said first group said second group of annular members also having a substantially isosceles triangle cross section to fit into the V-shaped openings between the annular members of said first group but with the triangular cross section inverted with respect to the triangular cross section of said first group of annular members so that the base of the triangular cross section is displaced from the circumference of the shaft, said second group of annular members being formed of a material having a higher coefficient of thermal expansion than the material forming said first group of annular members so that as the temperature increases the circumferential expansion of said second group of annular members is greater than the circumferential expansion of said first group of annular members to enable the latter to shift toward each other to reduce the dimension in the direction of compressive force transmission and thereby avoid the development of excessive forces when high temperatures are generated.

2. A device according to claim 1 wherein said first group of annular members are formed of Invar and said second group of annular members are formed of aluminum.

3. A device according to claim 1 wherein said shaft is rotatable and one of the elements is a bearing mounted on said shaft, said bearing having a race engaging said shaft; and the other element is a force producing means mounted on said shaft for producing a compressive force on said race, said annular members being mounted on said shaft between said race and said force producing means to transmit the compressive force from said force producing means to said race.

References Cited

UNITED STATES PATENTS

| | | | |
|---|---|---|---|
| 1,956,305 | 4/1934 | Baninger | 308—189 X |
| 2,597,161 | 5/1952 | Megel et al. | |
| 2,727,796 | 12/1955 | Sardou | 308—178 |
| 3,317,258 | 5/1967 | Hermann | 308—207 |

CARROLL B. DORITY, Jr., *Primary Examiner.*

U.S. Cl. X.R.

287—52.6, 52.7; 308—236